(12) United States Patent
Stephan et al.

(10) Patent No.: US 8,125,323 B2
(45) Date of Patent: Feb. 28, 2012

(54) WHEEL MONITORING DEVICE

(75) Inventors: Bernd Stephan, Schweinfurt (DE); Jens Graf, Schweinfurt (DE); Patrick Mayer, Würzburg (DE)

(73) Assignee: Aktiebolaget SKF, Göteborg (SE)

( * ) Notice: Subject to any disclaimer, the term of this patent is extended or adjusted under 35 U.S.C. 154(b) by 463 days.

(21) Appl. No.: 12/284,587

(22) Filed: Sep. 22, 2008

(65) Prior Publication Data
US 2009/0179748 A1 Jul. 16, 2009

(30) Foreign Application Priority Data
Sep. 20, 2007 (DE) .......... 10 2007 045 109

(51) Int. Cl.
*B60C 23/00* (2006.01)
*F16C 32/00* (2006.01)
(52) U.S. Cl. ... 340/447; 340/442; 340/445; 340/426.33; 73/146.5; 73/146.8; 116/34 R; 384/91; 384/448

(58) Field of Classification Search .......... 340/447
See application file for complete search history.

(56) References Cited

U.S. PATENT DOCUMENTS
4,520,344 A   5/1985   Shu
(Continued)

FOREIGN PATENT DOCUMENTS
DE       4309265       10/1983
(Continued)

*Primary Examiner* — Donnie Crosland
(74) *Attorney, Agent, or Firm* — Mark Ussai; Bryan Peckjian

(57) ABSTRACT

A wheel monitoring apparatus includes a measuring and evaluation unit designed to be fastened to the wheel in the region of at least one wheel nut or bolt of the wheel. The wheel monitoring apparatus includes at least one sensor for detecting a characteristic variable for a state of a wheel bearing and at least one sensor for detecting a tire pressure of a tire of the wheel.

18 Claims, 2 Drawing Sheets

U.S. PATENT DOCUMENTS

| | | | |
|---|---|---|---|
| 4,694,273 A | 9/1987 | Franchino | |
| 4,970,491 A * | 11/1990 | Saint et al. | 340/447 |
| 5,289,160 A * | 2/1994 | Fiorletta | 340/447 |
| 5,505,080 A * | 4/1996 | McGhee | 73/146.5 |
| 6,011,463 A * | 1/2000 | Cormier, Sr. | 340/447 |
| 6,046,672 A | 4/2000 | Pearman | |
| 6,742,386 B1 | 6/2004 | Larson | |
| 2004/0061601 A1 | 4/2004 | Freakes | |
| 2004/0081049 A1 | 4/2004 | Chan | |
| 2007/0276573 A1 | 11/2007 | Baumgartner | |

FOREIGN PATENT DOCUMENTS

| | | |
|---|---|---|
| DE | 3230418 | 2/1984 |
| DE | 3538233 | 5/1986 |
| DE | 60108973 | 7/2005 |
| DE | 102004012770 | 10/2005 |
| DE | 60121198 | 5/2007 |
| EP | 0832764 | 4/1998 |
| WO | WO2004098912 | 11/2004 |

* cited by examiner

WHEEL MONITORING DEVICE

This application claims priority to German Patent Application No. DE 10 2007 045 109.3, filed Sep. 20, 2007, the entire contents of which are incorporated herein by reference.

BACKGROUND OF THE INVENTION

The present invention relates to wheels, and more particularly to devices for monitoring characteristics of wheels.

Wheel monitoring apparatuses for measuring and evaluating unit which is designed to be fastened to the wheel in the region of at least one wheel nut of the wheel are known from the prior art, in particular in the field of wheel monitoring in trucks or truck trailers. Such wheel monitoring devices sometimes comprise at least one sensor for detecting a characteristic variable for a state of a wheel bearing. The state of the wheel bearing can be inferred, for example, by detecting a temperature of the wheel bearing and by detecting vibrations during travel, the vibrations having a characteristic frequency spectrum.

In comparison with wheel monitoring apparatuses which are not connected to the rim, wheel monitoring apparatuses of the generic type are particularly light and robust in order, on the one hand, to avoid an imbalance of the wheel as a result of the weight of the wheel monitoring apparatus and, on the other hand, to ensure a long service life despite the extreme conditions to which the wheel monitoring apparatus is exposed during operation. As a result of the fact that the wheel monitoring apparatus is fitted in the region of the wheel nut, the wheel monitoring apparatus can be easily accessed and easily mounted.

SUMMARY OF THE INVENTION

In one aspect, the present invention is an apparatus for monitoring a wheel, the wheel having a bearing, a tire, and at least one of a nut and a bolt. The apparatus comprises a measuring and evaluation unit configured to mount to the wheel proximal to the at least one of the nut and the bolt. The unit includes at least one sensor configured to detect a characteristic variable for a state of the wheel bearing, and at least one sensor configured to detect a pressure of the tire.

More specifically, an object of the present invention is, in particular, to provide a wheel monitoring apparatus of the generic type having an extended spectrum of functions and improved ease of use.

According to the present invention, the object is achieved by means of the features of claim 1, while advantageous refinements and developments of the invention can be gathered from the subclaims.

The present invention is based, in particular, on a wheel monitoring apparatus having a measuring and evaluation unit which is designed to be fastened to the wheel in the region of at least one wheel nut or bolt of the wheel, and having at least one sensor for detecting a characteristic variable for a state of a wheel bearing.

In order to provide a wheel monitoring apparatus of the generic type with an extended functionality, one aspect of the invention proposes providing at least one sensor for detecting a tire pressure of a tire of the wheel. Mounting the measuring and evaluation unit in the region of the wheel nut makes it possible, on the one hand, to ensure that the measuring and evaluation unit is easily accessible at any time and, on the other hand, to use the wheel nut to establish a releasable connection, for example in the form of a retaining or latching element, or to screw the measuring and evaluation unit to a rim of the wheel, wherein, in the latter case, a fastening element of the measuring and evaluation unit or the entire measuring and evaluation unit can be clamped between the wheel nut and the rim when screwing the wheel nut.

The characteristic variable for the state of the wheel bearing may be a temperature, which can be used to infer increased frictional forces in the wheel bearing, or alternatively an intensity of vibrations in a particular spectral range. Integrating the tire pressure monitoring system in the same measuring and evaluation unit which monitors the wheel bearings makes it possible to achieve potential cost savings in comparison with solutions having two or more separate monitoring apparatuses. As a result of the fact that the entire measurement and evaluation operation is carried out on the rotating part of the wheel, it is possible to avoid transmission of data from a rotating part of the wheel hub to a stationary part of the wheel hub, which is complicated in terms of design.

Power consumption of the measuring and evaluation unit can be restricted to the bare minimum if the measuring and evaluation unit can be activated by means of an interrogation signal and no or virtually no power is consumed for the rest.

According to one refinement or embodiment of the present invention, the measuring and evaluation unit may have a means for manually triggering the interrogation signal. The means may be a simple switch which, for example, may also be in the form of a capacitive sensor. The switch may be protected from inadvertent actuation, for example by small stones flying around while the truck is travelling, by means of a cover, for example.

As an alternative or in addition to the means for manually triggering the interrogation signal, the measuring and evaluation unit may have a receiver arrangement for wirelessly receiving the interrogation signal. The interrogation signal, which may also be in the form of a "wake-up pulse", may be, for example, an electromagnetic signal whose frequency is a resonant frequency of a resonant circuit in the measuring and evaluation unit. The interrogation signal may be triggered when an amplitude of the voltage oscillations at the resonant circuit exceeds a threshold value.

Another aspect of the invention proposes that the measuring and evaluation unit comprises a signal output means for outputting a measured value, the signal output means being able to be activated by means of an interrogation signal. The signal output means may be, for example, in the form of a transmitter for outputting a radio signal containing the measured value or in the form of a clear text display unit, for example a 7-segment display, an LCD display or else a touch-screen, and may be provided, if necessary, with a foldable cover for protecting the display unit. Indirectly or directly integrating one of the sensors in the resonant circuit also makes it possible to make the resonant frequency dependent on the measurement result. The resonant frequency then codes the measurement result which can thus be read from the outside in a simple manner by measuring the resonant frequency. The measuring and evaluation unit may thus be completely passive, that is to say without its own power supply.

It is also proposed that the measuring and evaluation unit is designed to use the interrogation signal to obtain power needed to activate the measuring and evaluation unit and the signal output means. The power may be buffer-stored in a resonant circuit and may activate a microprocessor with an evaluation algorithm implemented in it. The result of the evaluation algorithm can be coded and sent using the power obtained from the interrogation signal.

If a sensor for detecting the tire pressure is connected to an interior of the tire by means of a pressure hose, it is possible to ensure, on the one hand, thermal decoupling of the sensor from the temperature of the tire casing and, on the other hand, direct measurement.

As an alternative to this, the sensor for detecting the tire pressure may be arranged in the region of the tire and may be connected to the measuring and evaluation unit by means of a signal line or a simple wire. In this case, the sensor for detecting the tire pressure is arranged in a particularly advantageous manner in the region of a valve of the tire. This makes it possible to provide commercially available wheels with a tire monitoring apparatus according to the invention.

If the measuring and evaluation unit is designed to be fastened between two wheel nuts of the wheel, pivoting of the measuring and evaluation unit as a result of rotation around the axis of one wheel nut can be avoided, with the result that secure retention can be ensured even in the case of large centrifugal forces in the radial direction.

Fastening to the wheel nuts can be carried out in a reliable and quick manner without impairing the retention of the wheel nuts if the measuring and evaluation unit comprises at least one fastening lug for fastening the measuring and evaluation unit to the rim of the wheel. The fastening lug may be designed in such a manner that it can be braced between the wheel nut and the rim of the wheel.

It is also proposed that the measuring and evaluation unit has at least one means for obtaining electrical power from thermal energy and/or movement energy of the wheel. This makes it possible to dispense with batteries or another type of power supply. The means may use, for example, a thermovoltage which is driven, on the one hand, by high temperatures in a first region of the wheel, for example in the region of the wheel bearing or in the region of brake discs, and, on the other hand, by lower temperatures in an air-cooled region of the wheel.

The invention also proposes providing the wheel monitoring apparatus with a reading device for reading a wheel monitoring apparatus of the type described above, which reading device can generate the activation signal, in particular. In one particularly advantageous refinement, a wheel monitoring system comprises a plurality of measuring and evaluation units, which are each intended to be arranged on a tire, with the result that all tires of a truck plus trailer can be monitored, and a reading device for sequentially or simultaneously reading all measuring and evaluation units of the wheel monitoring system, a reading and display device then also being able to be arranged or integrated in the cockpit.

Further advantages emerge from the following description of the drawing. Exemplary embodiments of the invention are illustrated in the drawing. The drawing, description and claims contain numerous features in combination. A person skilled in the art will expediently also consider the features individually and will combine them to form expedient further combinations.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
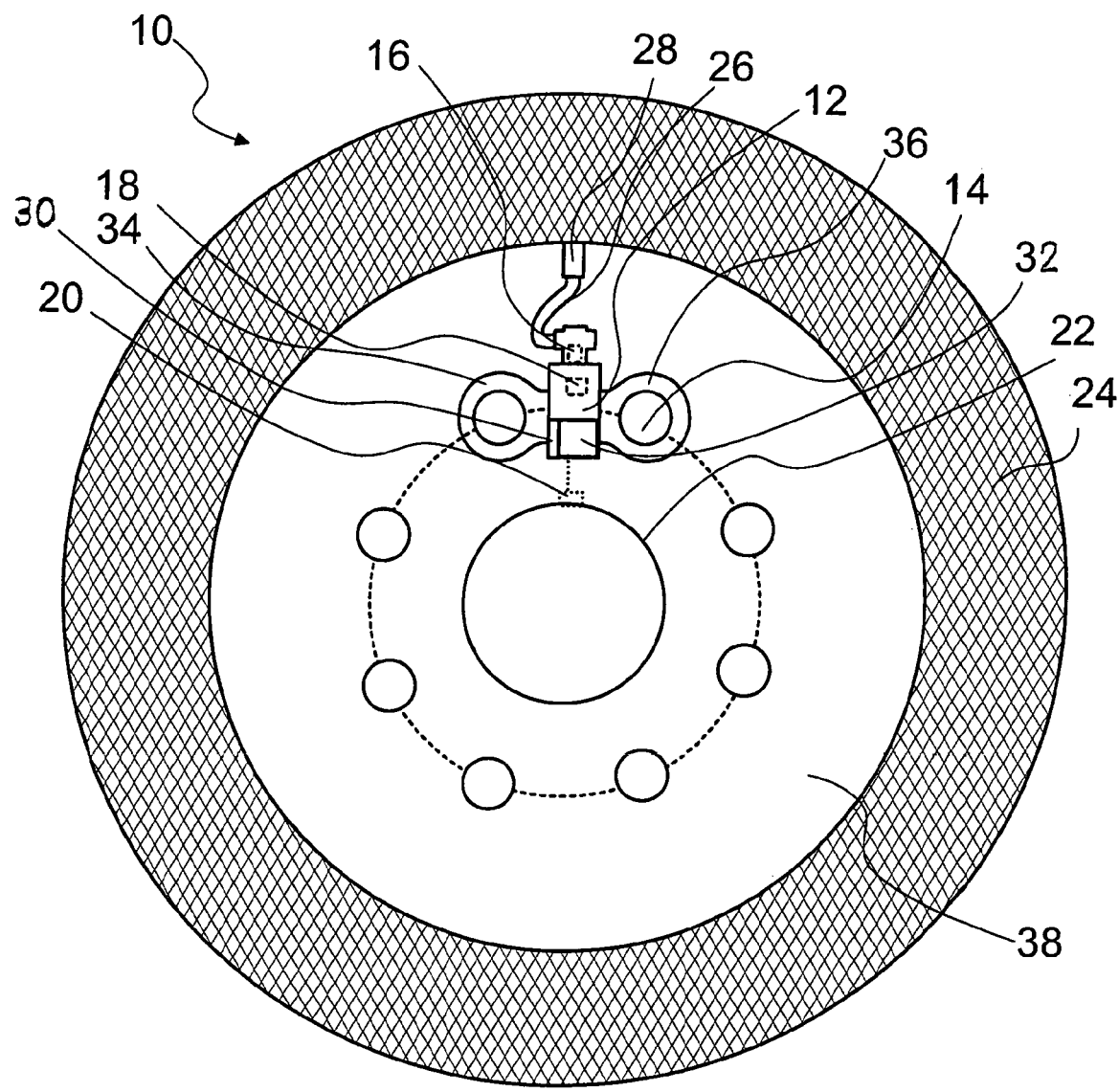
FIG. 1 depicts a wheel having a wheel monitoring apparatus according to a first construction of the invention.

Referring now to the drawing in detail, wherein like numbers are used to indicate like elements throughout, there is shown in FIG. 1 a wheel monitoring apparatus for monitoring a wheel 10 of a truck, a truck trailer, or other vehicle. The wheel monitoring apparatus comprises a measuring and evaluation unit 12 which is in the form of an integrated circuit and is designed to be fastened to the wheel 10 between two wheel nuts 14 of the wheel 10. The wheel monitoring apparatus also has a plurality of sensors 16, 18, 20; specifically a sensor 16 configured to detect tire pressure, a sensor 18 configured to detect a characteristic variable for a state of a wheel bearing 22, and one or more sensors 20 configured to sense at least one of various temperatures, for example a temperature of the wheel bearing 22, a temperature of brake discs and a temperature of a tire casing.

The one or more temperature sensors 20 can optionally be mounted at different mounting positions, with the result that it is possible to measure various temperatures. In the exemplary embodiment illustrated in FIG. 1, only one temperature sensor is arranged on an outer ring of the wheel bearing 22. The measuring and evaluation unit 12 includes one or more inputs for signal lines of temperature sensors 20 or other sensors by which the wheel monitoring apparatus can be optionally extended. As a result, the measuring and evaluation unit 12 may process, for example, the signals from two or more temperature sensors 20 which can be arranged at different points of the wheel 10 with different characteristic temperatures.

In an exemplary embodiment, the characteristic variable for a state of the wheel bearing 22 being monitored by the sensor 18 is the amplitude of vibrations of the wheel 10 in a central frequency range which is restricted, from the bottom, by the low-frequency variations in the acceleration of the measuring and evaluation unit 12, which are caused by changes in the speed of the truck/vehicle and the associated changes in the rotational acceleration of the measuring and evaluation unit 12, and, at the top, by high-frequency vibrations such as those produced, for example, by a tire profile or gravel on a roadway. Preferably, the sensor 18 for detecting the vibrations is an acceleration sensor.

The wheel monitoring apparatus according to the exemplary embodiment also comprises a sensor 16 for detecting a tire pressure of a tire 24 of the wheel 10, which sensor is connected to an interior of the tire 24 by means of a pressure hose 26. The pressure hose 26 can be pushed onto or attached to a valve 28 of the tire 24 and is has an end with a pin for opening the valve 28. With such a structure, the pin is released from a non-return mechanism of the valve 28 when disconnecting or unscrewing the pressure hose 26 such that the valve 28 closes.

The measuring and evaluation unit 12 comprises a means 30 which is in the form of a switch, for example a slide switch, and is intended to manually trigger an interrogation signal which can be used to activate the measuring and evaluation unit 12. In one refinement or construction of the invention, which is relatively simple in terms of design, the means 30 is used to close a circuit containing a battery and to switch on a microprocessor of the measuring and evaluation unit 12. The microprocessor taps off or determines the measured values from the various sensors 16, 18, 20 and displays them in a signal output means 32 in the form of a clear text display.

The signal output means 32 for outputting a measured value can thus likewise be activated by means of the interrogation signal. In different exemplary embodiments, the signal output means 32 may be, for example, in the form of a transmitter for outputting a radio signal containing the measured value or in the form of a clear text display unit, for example a 7-segment display, an LCD display or else a touchscreen. The measuring and evaluation unit 12 is provided with a foldable cover (not explicitly illustrated here) for protecting the display unit. The cover may also form the means 30 for manually triggering an interrogation signal, with the result that the measuring and evaluation unit 12 is automatically activated when the cover is lifted up.

The measuring and evaluation unit 12 includes an electronic subassembly which is mounted on a metal plate which is not explicitly illustrated here. Lateral ends of the metal plate form fastening lugs 34, 36 for fastening the measuring and evaluation unit 12 to the rim 38 of the wheel 10, the fastening lugs 34, 36 being designed to be braced between the wheel nut 14 and the rim 38 of the wheel 10 by virtue of the provision of holes with a suitable spacing and diameter.

The entire measuring and evaluation unit 12 is preferably arranged or disposed in a plastic housing which is resistant to chemicals and temperature and into which the metal plate is cast. The acceleration sensor 18 is preferably directly and permanently connected to the metal plate, with the result that the acceleration sensor 18 for detecting the vibrations produced by the wheel bearing 22 is connected to the rim 38, in a manner which is overall free of play, via the metal plate and the wheel nuts 14. The signals from the acceleration sensor 18 are processed by a high-pass filter, which filters out those components of the sensor signal which are caused by the rotational acceleration, and are then processed by a low-pass filter which eliminates high-frequency vibrations caused by the tire profile and by grit or gravel from the signal.

Figure 2:
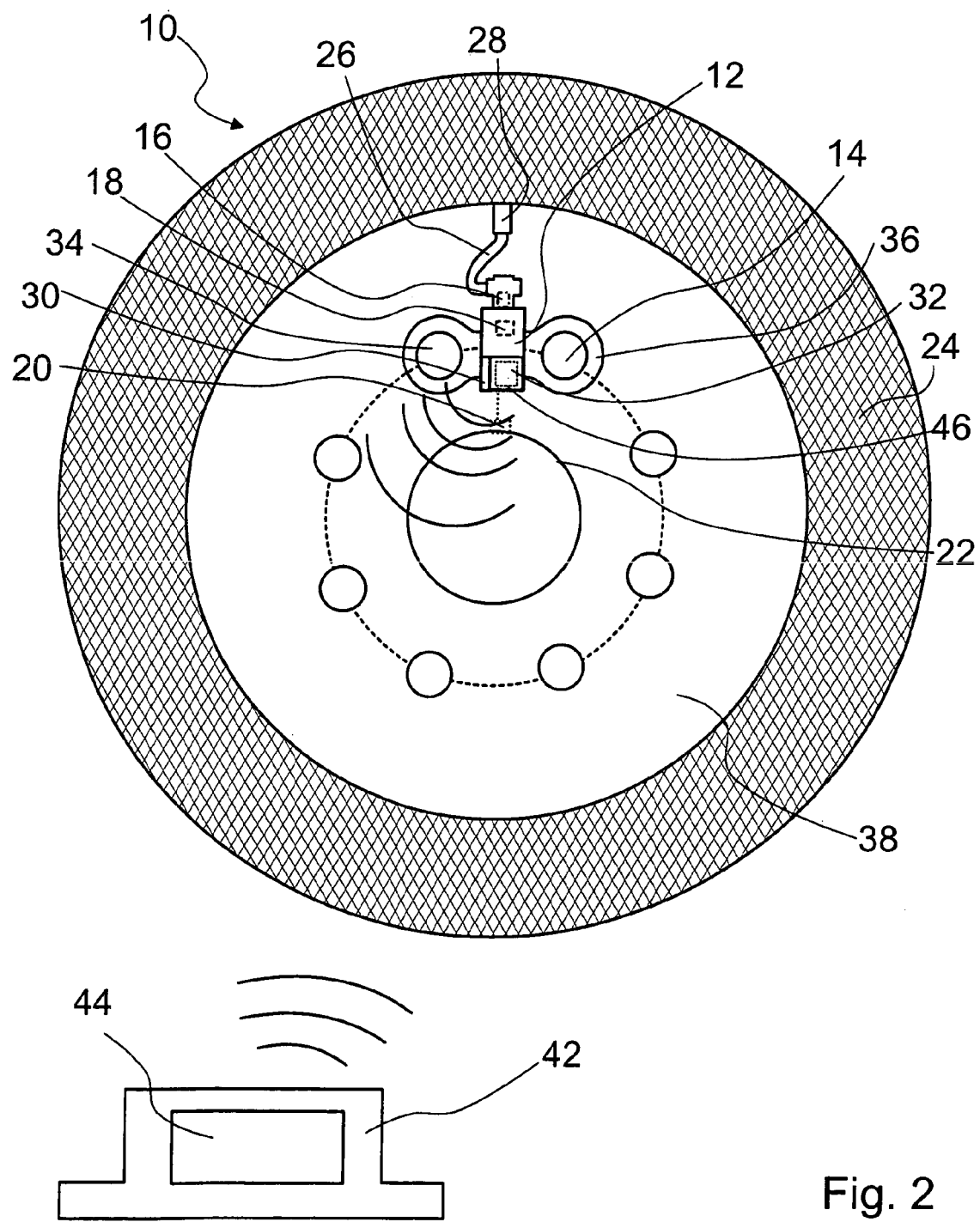
FIG. 2 depicts a wheel having a wheel monitoring apparatus which, in addition to a measuring and evaluation unit, includes a reading device according to a second construction of the invention.

FIG. 2 shows an alternative refinement or construction of the invention. The following description is essentially restricted to differences from the exemplary construction illustrated in FIG. 1, reference being made to the description of FIG. 1 with regard to features which remain the same. Similar or identically acting features of the two exemplary constructions are provided with the same reference symbols.

In contrast to the measuring and evaluation unit 12 illustrated in FIG. 1, the measuring and evaluation unit 12 depicted in FIG. 2 has a receiver arrangement 40 for wirelessly receiving the interrogation signal. A display on the measuring and evaluation unit 12 may be dispensed with but may also be additionally provided for the purpose of reading the measured data.

The wheel monitoring system further includes a reading device 42 for reading the wheel monitoring apparatus or for reading the measured data of the measuring and evaluation unit 12. The reading device 42 includes a transmitter for generating and wirelessly transmitting the interrogation signal and a receiver for receiving the measured data from the measuring and evaluation unit 12.

The interrogation signal is preferably an electromagnetic wave, in particular in the kHz to GHz range, and the measuring and evaluation unit 12 is designed to use the interrogation signal to obtain power needed to activate the measuring and evaluation unit 12 and the signal output means 32 by means of the integration of RFID technology. In this exemplary embodiment, the signal output means 32 includes a transmitter for transmitting the measured values from the measuring and evaluation unit 12 to the reading device 42.

The range of the transmitter in the reading device 42 is typically only a few meters, with the result that a driver of a truck or vehicle with the wheel monitoring apparatus can interrogate the measured data of the measuring and evaluation unit 12 arranged on a particular tire 24 in a targeted manner and can use the reading device 42 to interrogate the state of each tire 24 and each wheel bearing 22 during an inspection. The reading device 42 includes a display 44 on which the status of the bearing (e.g., "OK" or "NOT OK"), the tire pressure, and one or more temperatures detected by the temperature sensors 20 can be displayed.

In alternative refinements or constructions of the invention, the measuring and evaluation unit 12 may be provided with at least one means 46 (illustrated using dashed lines in FIG. 2) for obtaining electrical power from thermal energy and/or movement energy of the wheel 10. The means 46 may obtain power, for example in a cycle, from temperature differences between hot and cold regions of the wheel 10 or may use a thermovoltage produced by the temperature differences. It is also conceivable to provide a dynamoelectric arrangement which obtains power from the circular acceleration of the measuring and evaluation unit 12 during travel of the truck/vehicle. An autonomous power supply can thus be ensured. The power can be buffer-stored in a rechargeable battery for the purpose of buffering. It is possible to dispense with changing a battery.

In a further refinement (not illustrated here) of the invention, the sensor for detecting the tire pressure is arranged in the region of the tire 24, specifically in the region of a valve 28 of the tire 24, and is connected to the measuring and evaluation unit 12 by means of a signal line.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

LIST OF REFERENCE SYMBOLS

10 Wheel
12 Measuring and evaluation unit
14 Wheel nut
16 Sensor
18 Acceleration sensor
20 Temperature sensor
22 Wheel bearing
24 Tire
26 Pressure hose
28 Valve
30 Means
32 Signal output means
34 Fastening lug
36 Fastening lug
38 Rim
40 Receiver arrangement
42 Reading device
44 Display
46 Means

We claim:

1. An apparatus for monitoring a wheel rotatable about a central axis, the wheel having a bearing, a tire, and at least two bolts for fastening the tire to a vehicle, the apparatus comprising:

a measuring and evaluation unit configured to mount to the two bolts so as to be spaced from the central axis, the unit including at least one sensor configured to detect a characteristic variable for a state of the wheel bearing, and at least one sensor configured to detect a pressure of the tire.

2. The wheel monitoring apparatus according to claim 1, wherein the measuring and evaluation unit is configured to be activated by an interrogation signal.

3. The wheel monitoring apparatus according to claim 2, wherein the measuring and evaluation unit further includes a means for manually triggering the interrogation signal.

4. The wheel monitoring device according to claim 1, wherein the measuring and evaluation unit has a receiver arrangement configured to wirelessly receive the interrogation signal.

5. The wheel monitoring device according to claim 1, wherein the measuring and evaluation unit includes a signal output means for outputting a measured value, the signal output means being activateable by an interrogation signal.

6. The wheel monitoring device according to claim 5, wherein the signal output means includes a clear text display element configured to display the measured value.

7. The wheel monitoring device according to one of claims 5, wherein the measuring and evaluation unit is configured to use the interrogation signal to obtain power for activating the measuring and evaluation unit and the signal output means.

8. The wheel monitoring device according to claim 1, further comprising a pressure hose configured to connect the sensor for detecting the tire pressure to an interior of the tire.

9. The wheel monitoring device according to claim 1, wherein the sensor for detecting the tire pressure is arranged in a region of the tire and the device further comprises a signal line configured to connect the tire pressure sensor with the measuring and evaluation unit.

10. The wheel monitoring device according to claim 8, wherein the tire further includes a valve and the sensor for detecting the tire pressure is arranged proximal to the valve.

11. The wheel monitoring apparatus according to claim 8, wherein the measuring and evaluation unit is configured to be fastened between two wheel nuts or bolts of the wheel.

12. The wheel monitoring apparatus according to claim 1, wherein the measuring and evaluation unit includes at least one fastening lug for fastening the measuring and evaluation unit to the rim of the wheel, the fastening lug being configured to be braced between the wheel nut or bolt and the rim of the wheel.

13. The wheel monitoring apparatus according to claim 1, wherein the measuring and evaluation unit has at least one means for obtaining electrical power from thermal energy and/or movement energy of the wheel.

14. The wheel monitoring apparatus according to claim 1, further comprising a reading device configured to display data from at least one of the sensors.

15. The wheel monitoring apparatus according to claim 1, wherein the measuring and evaluation unit includes a metal plate with lateral ends forming fastening lugs each connectable with a separate one of the two bolts and an electronic subassembly mounted on the metal plate.

16. The wheel monitoring apparatus according to claim 15, wherein the sensor configured to detect a characteristic variable for a state of the wheel bearing is an acceleration sensor, the acceleration sensor being directly and permanently connected to the metal plate.

17. The wheel monitoring device according to claim 1, wherein the sensor configured to detect a characteristic variable for a state of the wheel bearing is a temperature sensor disposed on an outer ring of the wheel bearing.

18. The wheel monitoring device according to claim 1, wherein the measuring and evaluation unit is sized to fit substantially between the at least two adjacent bolts.

* * * * *